(12) United States Patent
Radermacher

(10) Patent No.: US 7,784,749 B2
(45) Date of Patent: Aug. 31, 2010

(54) SUPPORTING FRAMEWORKS

(75) Inventor: Uwe Radermacher, Weibern (DE)

(73) Assignee: Wolfcraft GmbH, Kempenich (DE)

( * ) Notice: Subject to any disclaimer, the term of this patent is extended or adjusted under 35 U.S.C. 154(b) by 150 days.

(21) Appl. No.: 10/769,200

(22) Filed: Jan. 29, 2004

(65) Prior Publication Data

US 2004/0135044 A1 Jul. 15, 2004

(30) Foreign Application Priority Data

Mar. 22, 2003 (DE) ................. 103 12 935

(51) Int. Cl.
*F16M 11/00* (2006.01)
(52) U.S. Cl. .............. 248/161; 248/127; 144/287; 198/782; 193/37
(58) Field of Classification Search ........... 248/161, 248/127, 121; 144/287, 286.1; 198/861.1, 198/782, 632, 313, 581; 182/152; D8/71; 269/289 MR; 193/35 R, 37
See application file for complete search history.

(56) References Cited

U.S. PATENT DOCUMENTS

| | | | |
|---|---|---|---|
| 326,801 A | 9/1885 | Sprague | |
| 0,501,242 A | 7/1893 | Bufkin et al. | |
| 850,317 A | 4/1907 | Ridgely | |
| 2,836,278 A | 5/1958 | Kindell | |
| 3,083,806 A | 4/1963 | Haines | |
| 3,635,327 A | 1/1972 | Thiessen | |
| 3,901,378 A | 8/1975 | Rolland | |
| 4,159,677 A | 7/1979 | Smith | |
| 4,492,354 A | 1/1985 | Rice | |
| 4,576,357 A | 3/1986 | Schrepfer | |
| 4,681,215 A * | 7/1987 | Martin ................. | 198/843 |
| D293,052 S | 12/1987 | Handler et al. | |
| 4,715,488 A | 12/1987 | Hewitt et al. | |
| 4,798,359 A | 1/1989 | Ball | |
| 4,911,279 A | 3/1990 | Thunissen | |
| 4,970,968 A | 11/1990 | Mattesky | |
| 5,064,156 A | 11/1991 | Handler et al. | |
| 5,086,911 A | 2/1992 | Douglas | |
| D325,679 S | 4/1992 | O'Mealy et al. | |
| 5,108,216 A | 4/1992 | Geyer et al. | |
| D328,397 S | 8/1992 | Handler et al. | |
| D338,820 S | 8/1993 | Sheftel | |

(Continued)

FOREIGN PATENT DOCUMENTS

DE 298 08 490 U1 9/1999

(Continued)

*Primary Examiner*—Kimberly T Wood
(74) *Attorney, Agent, or Firm*—K&L Gates LLP

(57) ABSTRACT

A supporting framework has at least one roller which is carried by a carrying frame. The roller has an axis positioned generally along the horizontal direction in the use position. An axial extension projects out of each opposite end of the roller. The carrying frame has a pair of opposite, generally vertically extending bearing limbs, each bearing limb having a bearing opening. Each axial extension of the roller extends into one of the bearing openings of the bearing limbs. Lateral guide elements are provided at the two opposite ends of the roller. Each lateral guide element has a radially projecting lug which can be moved between an active position and an inactive position. The lugs can prevent a workpiece from moving past the ends of the roller when the lugs are in the active positions.

5 Claims, 6 Drawing Sheets

U.S. PATENT DOCUMENTS

| | | |
|---|---|---|
| 5,299,656 A | 4/1994 | Grill |
| 5,337,875 A | 8/1994 | Lee |
| 5,435,411 A | 7/1995 | Borgatti |
| D360,953 S | 8/1995 | Sheftel |
| D361,390 S | 8/1995 | Sheftel |
| D362,608 S | 9/1995 | Hewitt |
| 5,667,207 A | 9/1997 | Pistole |
| 5,810,038 A | 9/1998 | Carpinella |
| 5,878,839 A | 3/1999 | Lin |
| 6,018,974 A | 2/2000 | Potthoff et al. |
| 6,095,319 A | 8/2000 | Noniewicz et al. |
| D432,246 S | 10/2000 | Pestone |
| 6,161,681 A * | 12/2000 | Kalm ................... 198/790 |
| 6,179,024 B1 | 1/2001 | Yang |
| 6,179,116 B1 | 1/2001 | Noniewicz et al. |
| D439,820 S | 4/2001 | Yang |
| 6,279,717 B1 * | 8/2001 | Chen ................... 193/35 MD |
| 6,302,255 B1 | 10/2001 | Hollarder |
| 6,357,705 B1 | 3/2002 | Hackett |
| D457,998 S | 5/2002 | Pestone |
| D459,048 S | 6/2002 | Leemans |
| 6,481,564 B2 | 11/2002 | Kalm |
| 6,575,213 B1 * | 6/2003 | Houk ................... 144/287 |
| 6,623,082 B1 | 9/2003 | Huang |
| 6,626,405 B1 | 9/2003 | Keast et al. |
| 6,758,449 B1 * | 7/2004 | Chen et al. ................... 248/146 |
| 6,761,340 B2 | 7/2004 | Shaw |
| 6,883,530 B2 | 4/2005 | Kawakami |

FOREIGN PATENT DOCUMENTS

| | | |
|---|---|---|
| DE | 199 21 455 | 12/1999 |
| DE | 100 55 925 A1 | 5/2002 |
| DE | 202 08 954 U1 | 12/2002 |
| DE | 103 129 35 | 10/2004 |
| DE | 10319067 | 11/2004 |
| FR | 564 568 | 1/1924 |
| FR | 2 627 417 | 8/1989 |
| GB | 2 042 039 A | 9/1980 |
| GB | 2 296 938 A | 7/1996 |
| JP | 4-292349 | 10/1992 |

\* cited by examiner

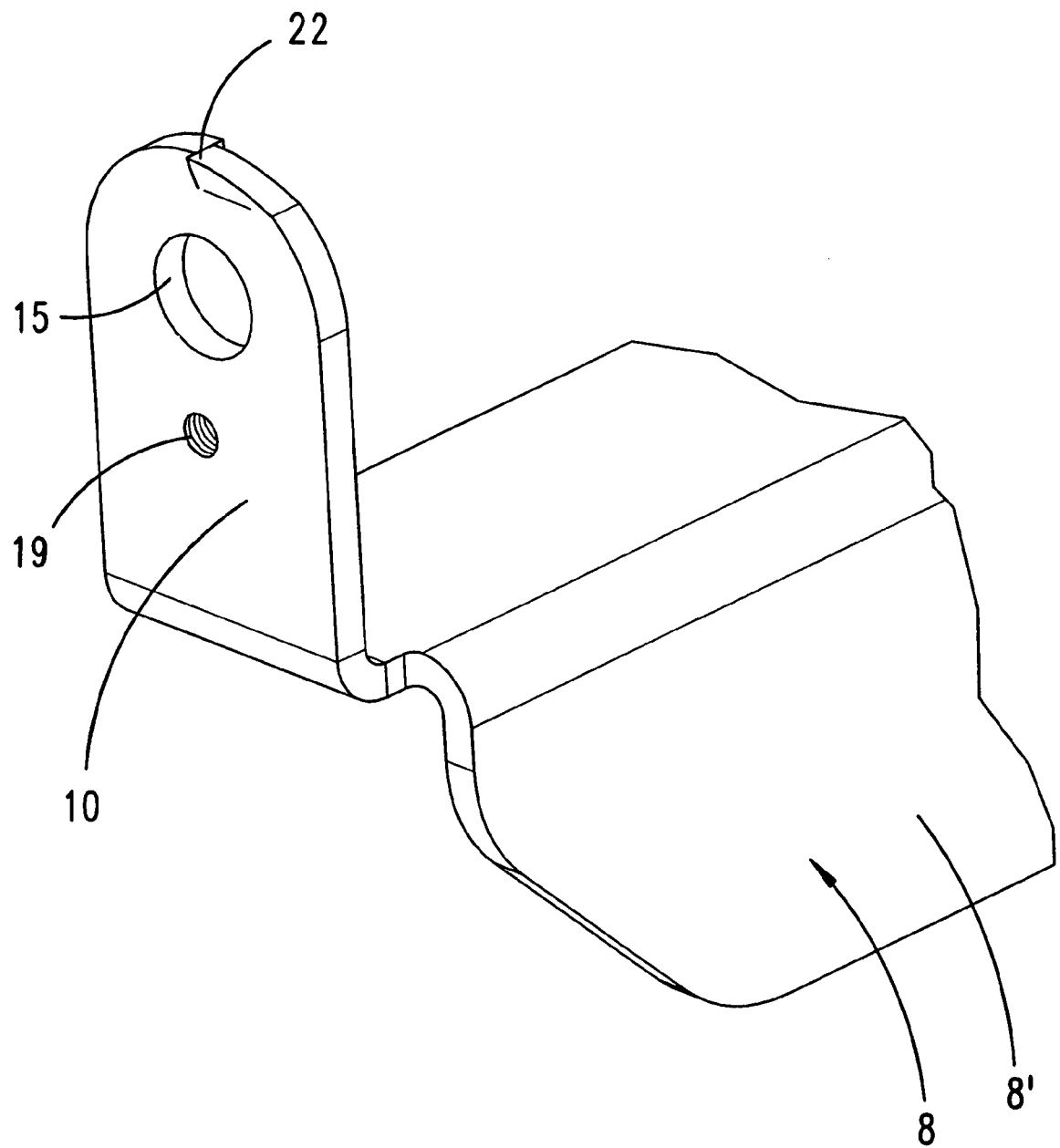

US 7,784,749 B2

SUPPORTING FRAMEWORKS

PRIORITY CLAIM

This patent application claims priority of German patent application number 10312935.9, filed Mar. 22, 2003, the entire disclosure of which is incorporated herein by reference.

CROSS REFERENCE TO RELATED APPLICATIONS

The present application relates to the following commonly-owned pending patent application: U.S. patent application Ser. No. 10/834,608 filed on Apr. 28, 2004.

BACKGROUND OF THE INVENTION

The present invention relates to supporting frameworks. In an embodiment of the invention, a supporting framework has at least one roller which is carried by a carrying frame. The axis of the roller is located along the horizontal direction in the use position, and projects, by way of axial extensions, out of the ends of the roller. The axial extensions project through bearing openings in vertically extending bearing limbs of the carrying frame. The lugs can prevent a workpiece from moving past the ends of the roller when the lugs are in the active positions. The supporting frameworks of the present invention can also be described as roller stands.

Supporting frameworks have long been known from the prior art. Such a supporting framework is described, for example, in German patent document number DE-A1 1 055 925. In that document, it is provided that the substructure of the supporting framework has a pair of legs. This pair of legs has, on the floor side, an extension arm in the form of a crossmember, which has feet at the ends. A height-adjustable tube, which carries a supporting head at the end, may project out of one of the legs. This supporting head carries a roller, the axis of which is located along the horizontal, so that a workpiece may be positioned on the vertex of the roller, for support of the workpiece.

SUMMARY OF THE INVENTION

An advantage of the present invention is to provide a supporting framework in a functionally advantageous manner.

In an embodiment of the present invention, two lateral guide elements, which are each seated flatly on bearing limbs, can each be pivoted back and forth about an axial extension between an active position and an inactive position and project beyond the roller radius. As a result of this configuration, the lateral guide elements counteract the situation where the workpiece resting on the roller veers out laterally beyond the ends of the roller, provided that the width of the workpiece is less than the longitudinal extent of the roller.

If the workpiece is wider than the longitudinal length of the roller, it is advantageously possible for the lateral guide elements to be pivoted back and forth from the active position into an inactive position.

Preferably, the lateral guide elements are lugs integrally formed on lug support disks. Each lug support disk may have a central bearing opening which is plugged onto the axial extension projecting from the end of the roller and is enclosed or at least partially surrounded by an approximately semicircular slot. A single fastening screw, for example, may project through the slot. Furthermore, the single fastening screw may be screwed into a threaded bore of the bearing limb, disposed directly beneath the axial extension and rests on the peripheries of the semicircular slot by way of its head.

A catch is also advantageously provided which, in respect of the axial extension, is disposed on that side of the bearing limb which is directed away from the fastening screw and, with the lateral guide elements moved into the active position, projects into the semicircular slot. The catch may be located in front of a narrow wall of the semicircular slot. The catch is advantageously formed by a notched portion. The notch may be disposed along a peripheral incision of the bearing limb, which can be formed by a metal sheet.

Moreover, it is further preferably provided that it is possible to overcome the action of the catch by tilting the lug support disk alongside the lateral guide element axially about the fastening location. The lug support disk may be a punched part.

It is further provided that, in its vertically upwardly oriented active position, the lateral guide element assumes the position in which it is secured against pivoting by the catch or latching stop and an end stop of the fastening screw. The lateral guide elements may be sheathed in plastic material. Also, the lateral guide elements may form a pivoting handle.

Located diametrically opposite the semicircular slot is a window, which can be configured as a double arrow.

The diameter of the lug support disk is smaller than the diameter of the roller.

Additional features and advantages of the present invention are described in, and will be apparent from, the following Detailed Description of the Invention and the figures.

BRIEF DESCRIPTION OF THE FIGURES

FIG. 6 shows a detailed, perspective view of the carrying frame with a bearing limb.

DETAILED DESCRIPTION OF THE INVENTION

Figure 1:
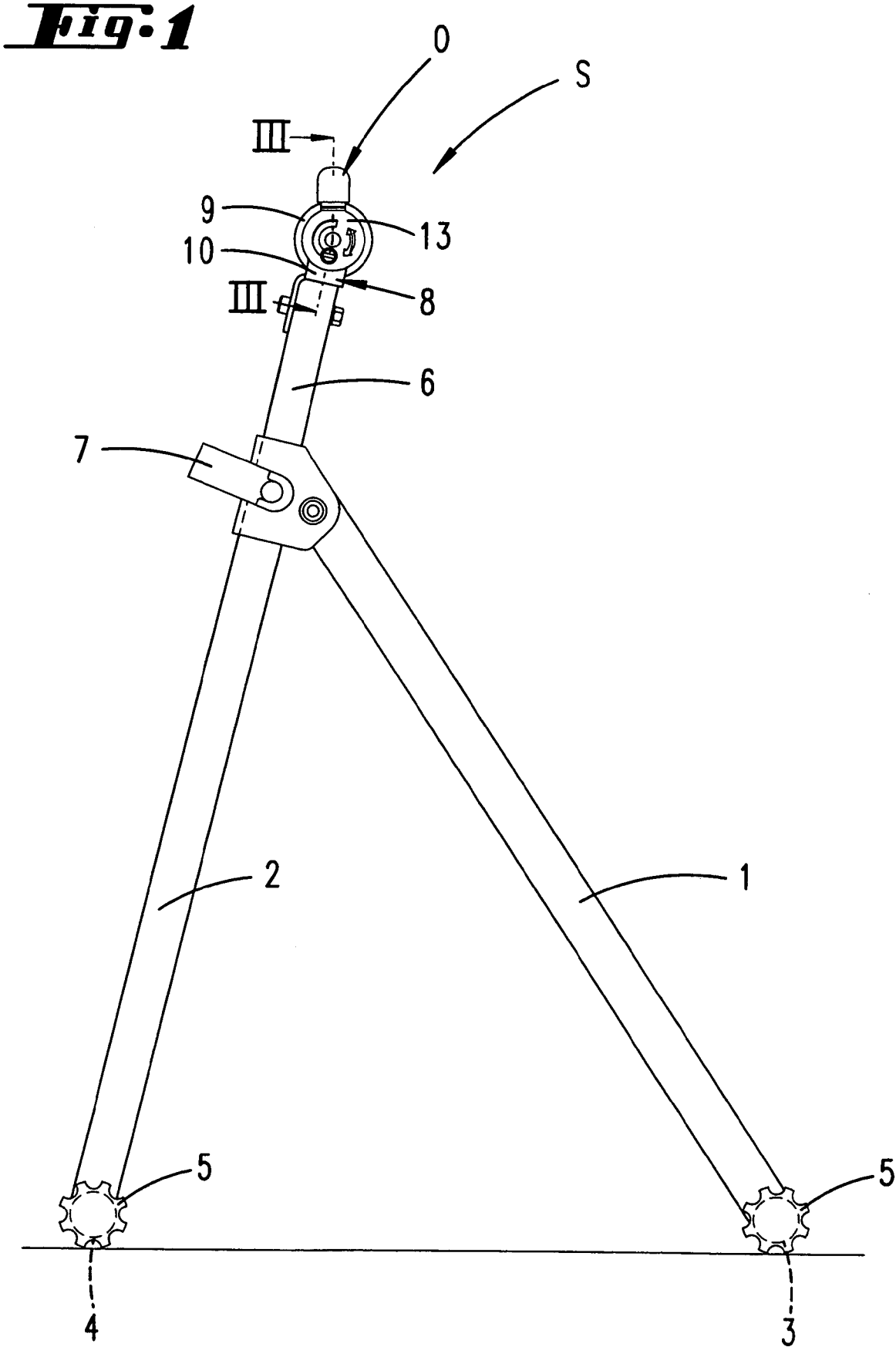
FIG. 1 shows a supporting framework according to the present invention in an elevational view.
Figure 2:
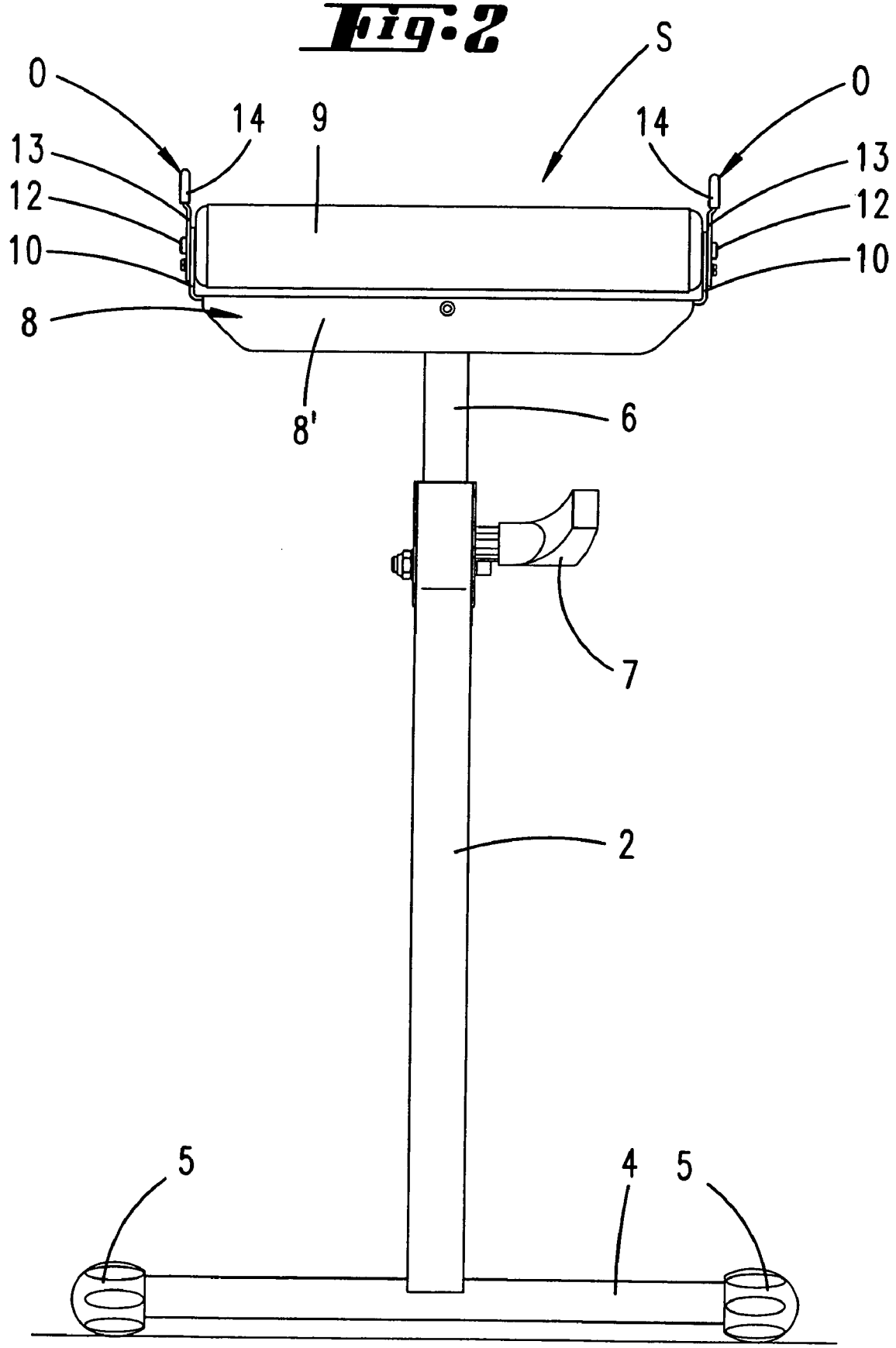
FIG. 2 shows the supporting framework of FIG. 1 in a side view.

Referring to FIGS. 1 and 2, the legs 1, 2 of the supporting framework S are substantially in the form of an upside-down T. The crossbar of the T in each case form a cross member 3, 4, at the ends of which are seated end caps 5 which form the feet of the supporting framework S.

The supporting framework S has a fixed leg 2. A supporting tube 6 is mounted in the fixed leg 2 and can be telescoped out of the fixed leg 2 and can be fixed in various height positions by means of a clamping element 7. In the region of the clamping element 7, the second, longer leg 1 is articulated in a pivotable manner, so that it can be moved from a stop-limited spread-out position, which is illustrated in the drawings, into a position in which it is parallel to the fixed leg 2.

Figure 3:
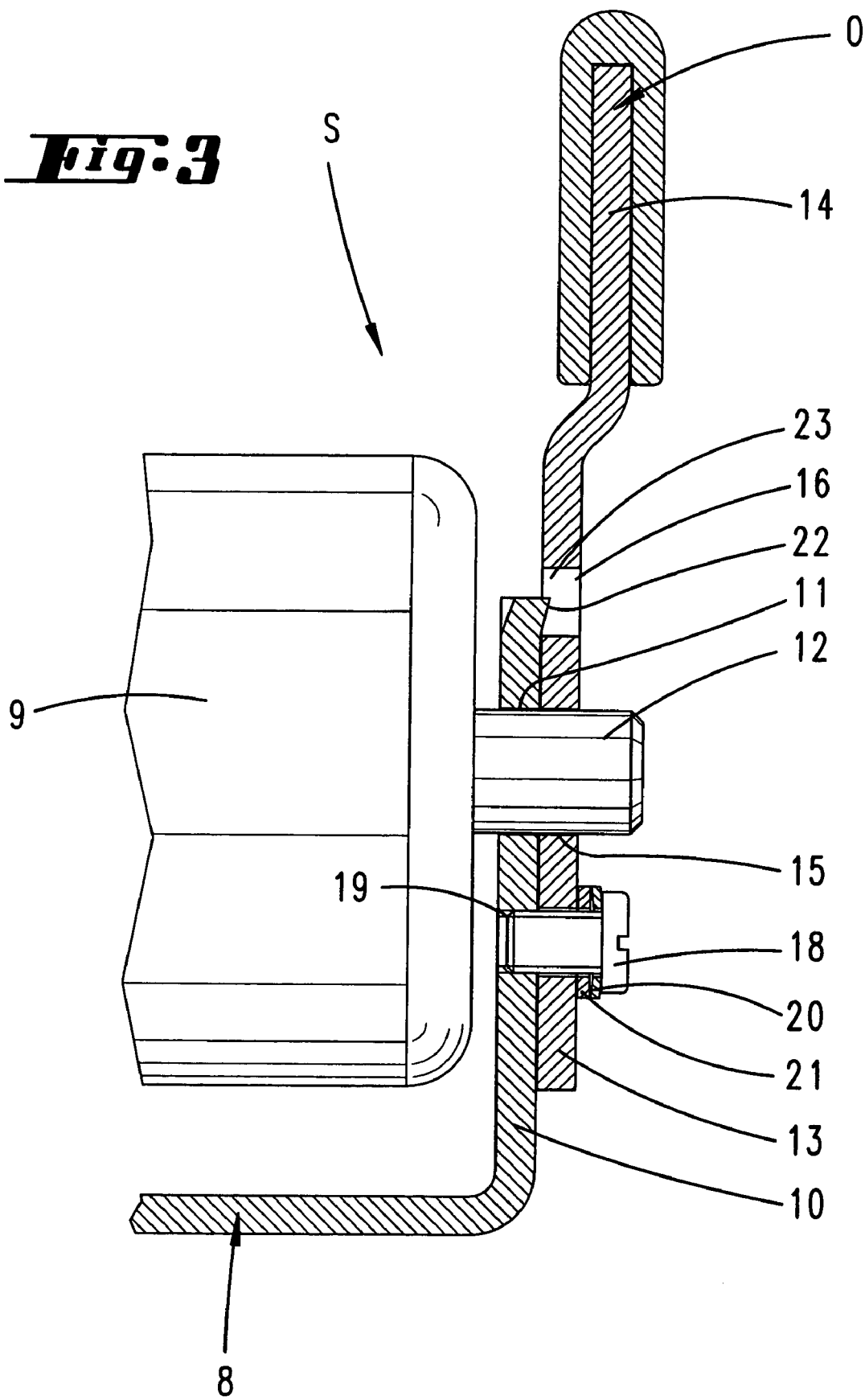
FIG. 3 shows a partial sectional view along line III-III in FIG. 1 on an enlarged scale with the lateral guide element moved into an active position.
Figure 4:
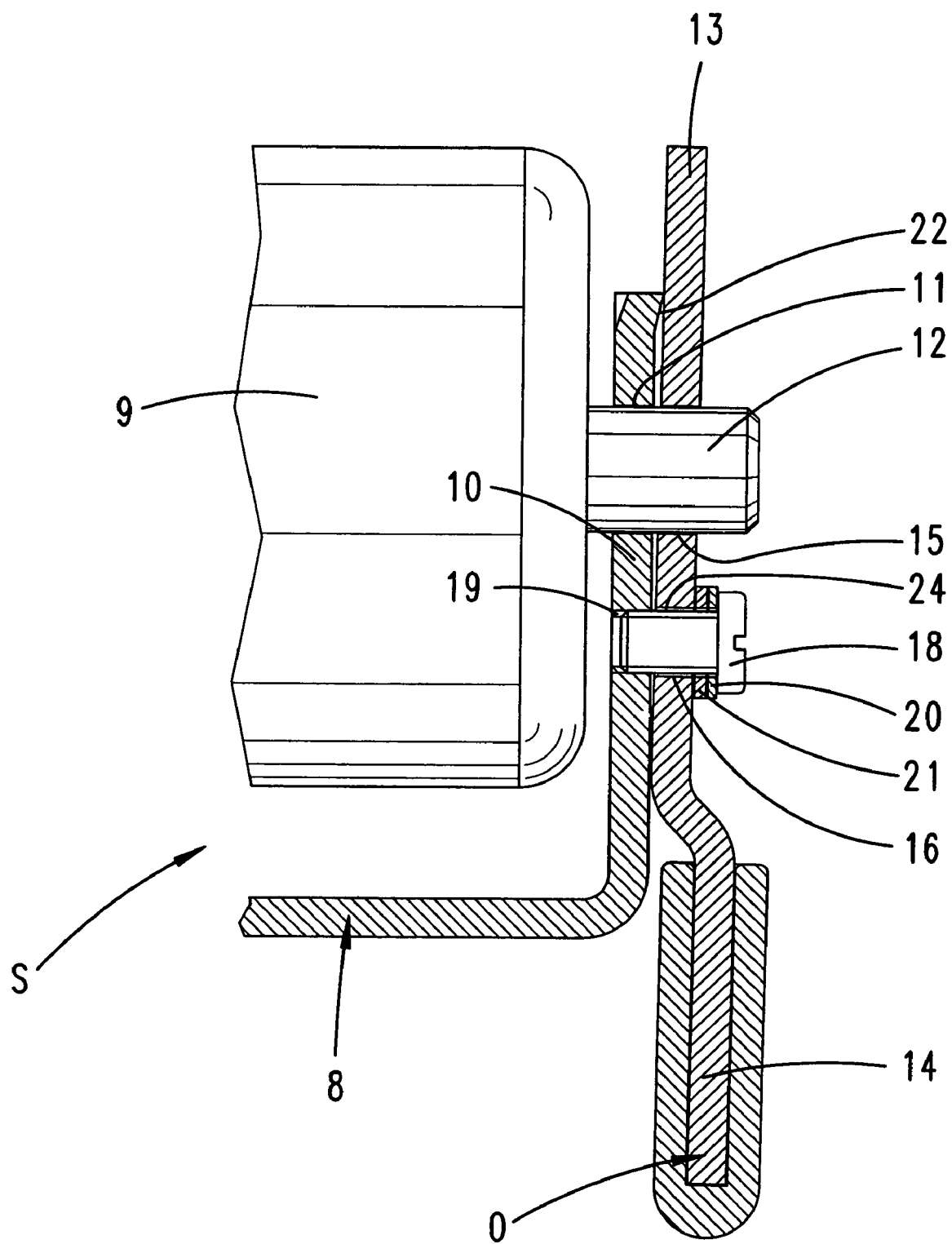
FIG. 4 shows the supporting framework of FIG. 3 with the lateral guide element moved into an inactive position.
Figure 5:
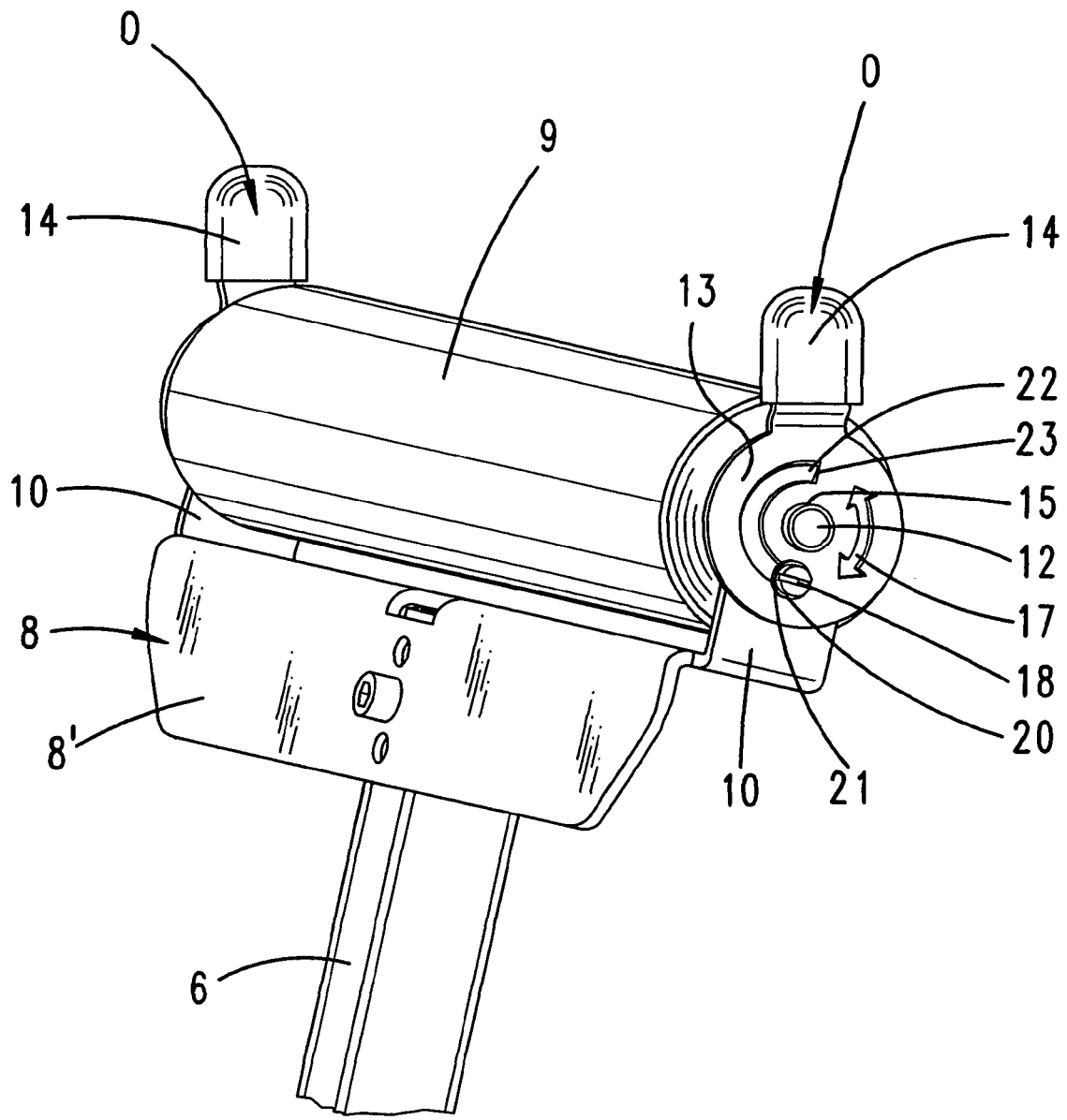
FIG. 5 shows a detailed, perspective view of the roller-containing carrying frame of the supporting framework with the lateral guide elements moved into an active position.

Referring also to FIGS. 3-5, a carrying frame 8 or roller support is screwed onto the free end of the supporting tube 6. The carrying frame 8 has a U-shaped configuration and carries a roller 9 capable of supporting a workpiece. Furthermore, the carrying frame 8 has an angled portion 8', by which the carrying frame 8 is screwed to the end of the supporting tube 6. The U-shaped opening of the carrying frame 8 is used for mounting the roller 9. The bearing limbs 10 or opposed ends of the carrying frame 8, which form U-limbs, have bearing openings 11. The roller 9 engages, by way of its axial extensions 12, in the bearing openings 11 of the bearing limbs 10, which form the U-limbs. Lateral guide elements O or workpiece guides which are disposed opposite one another and associated with the ends of the roller 9 are plugged onto the axial roller extensions 12 projecting from the bearing openings 11. The mutually facing inner surfaces of the lateral guide elements O rest flatly on the outer surfaces of the bearing limbs 10.

The lateral guide elements O each comprise a circular lug support disk 13 and a radially projecting lug 14 integrally formed thereon. The lateral guide elements O, which are produced as punched parts, have their lugs 14 sheathed in plastic material. The plastic-sheathed lugs 14 each provide the function of a pivoting handle. Furthermore, the lug support disks 13 each have a central bearing opening 15, in which the axial roller extensions 12 are accommodated. Disposed around the central bearing openings 15, the lug support disks 13 each have a semicircular slot 16.

Fastening screws 18 are provided for securing the lateral guide elements O in a pivotable manner on the bearing limbs 10 of the carrying frame 8. These fastening screws 18 project through the semicircular slots 16 of the lug support disks 13 into threaded bores 19 of the bearing limbs 10 which are located beneath the bearing openings 15. See the illustrations in FIGS. 3 and 4, in particular. Furthermore, a spring ring 20 and a washer 21 are associated with each fastening screw 18. The washers 21 rest on the peripheries of the semicircular slots 16. The spring rings 20 are positioned such that they are disposed between the screw heads and the washers 21.

Referring to FIGS. 3-6, the sheet-metal carrying frame 8 has peripheral incisions in the form of notched portions disposed in each case on its bearing limb 10 above the bearing openings 11. Each notched portion performs the function of a catch 22. The catches 22, which are oriented away from the end surfaces of the roller 9, project beyond the inner surfaces of the lug support disks 13 into the semicircular slots 16. The catches are located in the slots 16, with the lateral guide elements O oriented vertically, in each case in front of the narrow walls 23 of the semicircular slots 16.

If the user positions on the vertex of the transversely oriented roller 9 a workpiece (not illustrated) which has a width which is less than the length of the roller 9, the user can pivot the lateral guide elements O, via the lugs 14, into a vertically upwardly directed, catch-secured active position. This counteracts any possibility of the workpiece veering out laterally beyond the end peripheries of the roller 9. In this position, as has already been mentioned, each catch 22 is located in front of the narrow walls 23 of the curved slots 16. In this vertically upwardly oriented active position, the lateral guide elements O, as a result of the catch-formed latching stops and end stops formed by the fastening screws 18, assume a position in which they are secured against pivoting.

In order for the lateral guide elements O to be moved into inactive positions, the later guide elements O can be pivoted, via the lugs 14, in the direction of the double arrows 17. In this case, the following takes place: the lateral guide elements O, in the upwardly oriented active position, initially only have to be pulled away to a minimal extent from the end surfaces of the roller 9. In the course of the associated pivoting movement, the catch 22 passes out of the curved slots 16, counter to the spring force of the spring ring 20, and slides along the inner surfaces of the lug support disks 13 until the narrow walls 24 of the curved slots 16 engage against the end-stop-forming fastening screws 18. Furthermore, the lateral guide elements O assume a slightly oblique vertical position in relation to the bearing limbs 10 as a result of the spring rings 20, see the illustration in FIG. 4 in particular. The lateral guide elements O have thus assumed the downwardly directed, vertical inactive position, and the user can position an overly wide workpiece on the vertex of the roller 9 of the supporting framework S, even such that the workpiece projects beyond the end surfaces of the roller 9. The lateral guide elements O can be placed in their active and inactive positions independent of each other. Also, the lateral guide elements O can be rotated to various positions, as may be desired, such that the lugs 14 can have various positions between the active and inactive positions.

If a workpiece (not illustrated) is of sufficiently greater width, it is also possible to set up a second supporting framework S, if present, such that the two supporting frameworks S and/or the rollers 9 are aligned with one another. All that may be required here is for the outer lateral guide elements O to be pivoted into an active position. The inner lateral guide elements O, which are directed toward one another, remain in the downwardly directed inactive position. This is only possible, however, since the diameter of the lug support disks 13 of the inner lateral guide elements O are smaller than the diameter of the rollers 9 so as not to interfere with the workpiece. Similarly, additional supporting frameworks S can be utilized to support a workpiece. Even further, the lateral guide elements O can be individually positioned between active and inactive positions as desired.

Via the fastening screws 18, it is possible to set the surface pressure of the lateral guide elements O on the bearing limbs 10 by means of a screwing tool.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A supporting framework, comprising:
a roller having a radius, a top support surface, and an axis positioned generally horizontally when in a use position;
a carrying frame carrying the roller; and
a plurality of lateral guide elements coupled to the carrying frame, one of the lateral guide elements being positioned adjacent to one of the ends of the roller, another one of the lateral guide elements being positioned adjacent to another one of the ends of the roller, each one of the lateral guide elements having an extension portion with a length which is greater than the radius of the roller, each one of the extension portions being pivotal relative to the carrying frame between an active position and an inactive position, wherein the carrying frame has upwardly extending bearing limbs and further comprising a plurality of catches disposed on the bearing limbs and, with the lateral guide elements moved into the active position, project into slots in the lateral guide elements,
the extension portions in the active position extending toward the top support surface of the roller, wherein the extension portions define a free space, the free space positioned between the extension portions in the active position and beyond the top support surface, the free space configured to provide access to the top support surface in the active position, and the extension portions in the inactive position located outside the free space.

2. The supporting framework according to claim 1, wherein each catch is formed by a notched portion along a peripheral incision of the bearing limb.

3. The supporting framework according to claim 1, wherein each lateral guide element is tilted about a fastening location and releases the catch.

4. The supporting framework according to claim 1, wherein each lateral guide element in the active position is in a generally vertically upwardly oriented position in which the lateral guide element is secured against pivoting by the catch and a fastener projecting through the slot.

5. A roller stand, comprising:

a framework;

a roller support connected to the framework and having a plurality of opposed ends;

a workpiece-supporting roller supported by the roller support between the ends, the workpiece-supporting roller having a radius and a top support surface configured to support a workpiece in a space, at least part of the top support surface extending along an axis;

at least one workpiece guide coupled to one of the ends of the roller support, the workpiece guide having a guide portion with a length which is greater than the radius of the workpiece-supporting roller, the workpiece guide being movable relative to at least one end of the roller support between:

(a) an active position outside of the space in which the guide portion extends beyond the axis, and (b) an inactive position outside of the space in which the guide portion remains below the axis; and a position retainer associated with the workpiece guide and resisting movement of the workpiece guide from the active position, wherein the position retainer includes a catch protrusion extending into a protrusion-receiving opening, the protrusion-receiving opening is a slot and the position retainer is a stop projection extending into the slot.

* * * * *